(No Model.) 2 Sheets—Sheet 1.
M. P. UPP & J. C. YOUNG.
CORN PLANTER.
No. 499,862. Patented June 20, 1893.
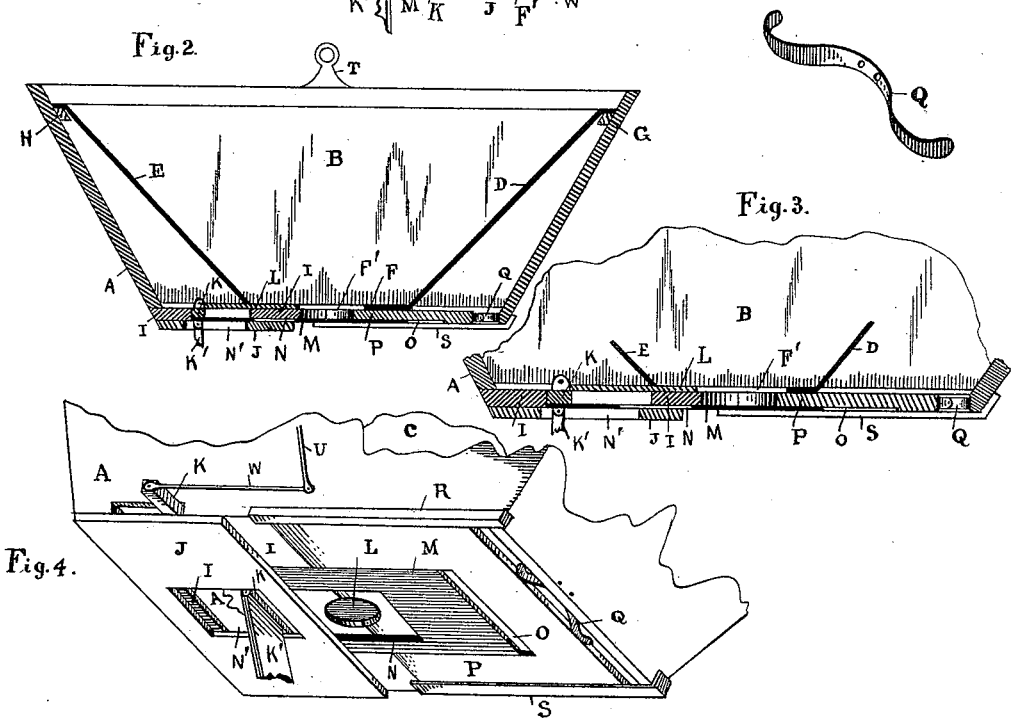
Witnesses.—
A. Keithley.
F. J. O'Brien.
Inventors—
Melville P. Upp
John C. Young
By L. M. Thurlow — Atty.

(No Model.) 2 Sheets—Sheet 2.
M. P. UPP & J. C. YOUNG.
CORN PLANTER.
No. 499,862. Patented June 20, 1893.
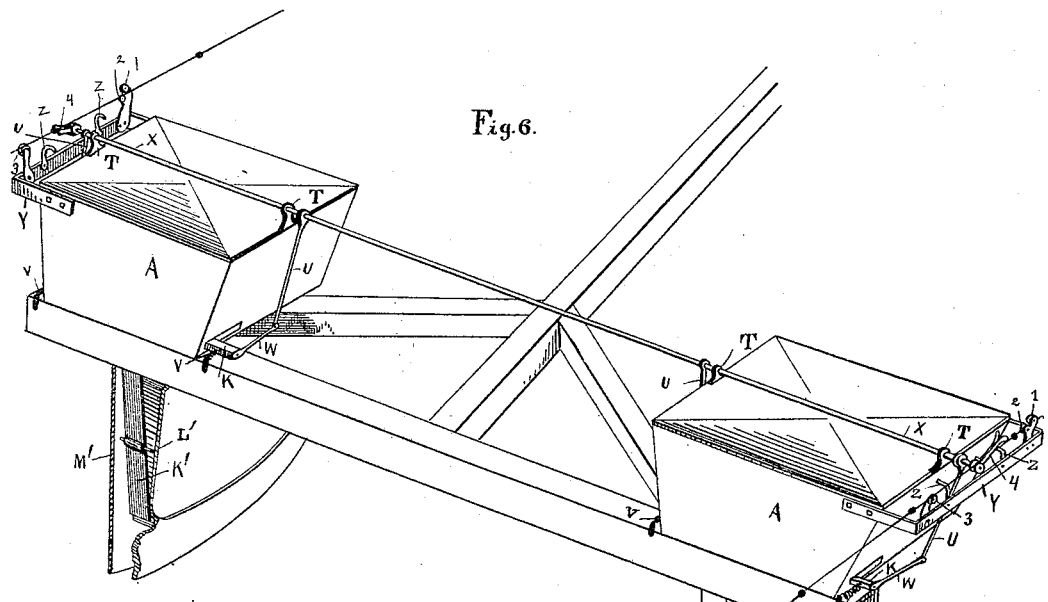
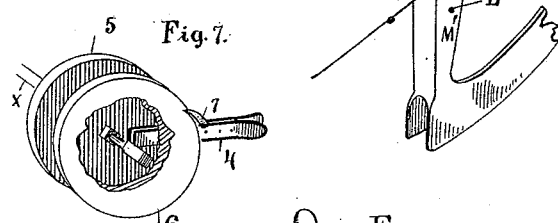
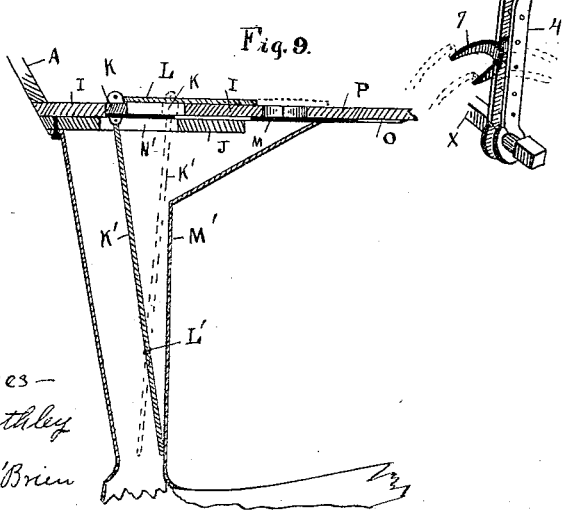
Witnesses—
A. Keithley
F. J. O'Brien
Inventors.
Melville P Upp
John C. Young
By L. M. Thurlow
Atty

UNITED STATES PATENT OFFICE.

MELVILLE P. UPP AND JOHN C. YOUNG, OF KILBOURNE, ILLINOIS.

CORN-PLANTER.

SPECIFICATION forming part of Letters Patent No. 499,862, dated June 20, 1893.

Application filed November 4, 1891. Serial No. 410,833. (No model.)

*To all whom it may concern:*

Be it known that we, MELVILLE P. UPP and JOHN C. YOUNG, citizens of the United States, residing at Kilbourne, in the county of Mason and State of Illinois, have invented certain new and useful Improvements in Corn-Planters; and we do hereby declare the following to be a full, clear, and exact description of the invention, such as will enable others skilled in the art to which it appertains to make and use the same.

This invention relates to improvements in corn planters.

The object of the invention is to provide a double slide cut off which, when in one position, the seed may drop through an aperture in the bottom of the seed box on to a lower slide, and when in another position, the said aperture may be closed at the top by an upper slide and simultaneously the lower slide be removed and the seed allowed to drop, and furthermore a lever for controlling the dropping of seed within the shank of the planter is operated by the sliding mechanism within the seed box.

In the drawings presented herewith, Figure 1 represents a perspective view of the interior of the seed box and cut off and showing certain parts broken away. Fig. 2 is a sectional elevation through the middle of the seed box and showing one side thereof. Fig. 3 is also a sectional view through the middle of the bottom of seed box. Fig. 4 is a perspective view of the bottom of the seed box showing an under slide. Fig. 5 is a perspective view of a slotted plate used in the seed box. Fig. 6 is a perspective view of a corn planter showing manner in which the seed boxes and their essential parts are placed thereon. Fig. 7 is a detail view of a portion of the operating mechanism. Fig. 8 is a detail view of the fork of the operating mechanism showing certain parts in dotted lines. Fig. 9 is a sectional side elevation of part of the seed box shank and runner of the planter showing a cut off lever.

In the several figures, A represents the seed box having slanting sides and ends in the usual manner. The said box is provided on its interior with false sides B and C as shown which are simply two blocks of wood or metal beveled in a wedge shape, as shown at C Fig. 1. These blocks are secured to the sides of seed box and thus leave a funnel shaped space between them. These blocks do not touch the bottom of box, but are held somewhat above it to let the under parts work freely.

A sheet metal plate composed of the slanting ends D and E respectively and the slotted bottom F is made in the following manner: The center portion F is made the same width as the width of the space between the blocks B C at the bottom, and the ends D and E are made to fit between the sides B and C and the upper edges of the ends D and E are bent over to form flanges which rest on the cleats G and H on each of the seed boxes. The blocks B and C may be substituted by the sides of the box A by simply giving the sides more of a slant or the same slant as the said blocks B and C afford. As may be seen, a portion of the bottom I is cut away leaving a slot across the bottom of box and into which sets a rod K and said rod rests on a strip J placed thereunder. On the top of the rod K is hinged a plate L which enters the slot F' in the plate D, E, F as shown. The object of the upper plate L being hinged to the sliding rod K is, that the plate D, E, F may be raised out of the box and the said plate L raised up out of the way in case it is desired to alter any of the parts in the said box. Into the under side of the rod K and flush therewith is set a slotted plate M, which slides on the strip J. The half bottom I is grooved out as shown in Fig. 4 at O, so that the said plate M may slide therein.

The other half of the bottom of seed box is shown at P and it may be seen that the edges of the two bottom halves I and P come together, except at the immediate center where an opening is made, by cutting out of each half of the bottom a semi-circular notch and as the halves come together these notches form a perfectly round hole. A space of about an inch is left between the rear end of the bottom half P and the front end of the box as shown and a spring Q is placed therein and secured to the end of said box and presses against the half P to keep it in place. It is designed that the half P should slide back and forth and to make this possible, two slideways R and S are secured to the sides of the box for that half P to slide in. A lever or flirt-valve K' for controlling the dropping of the seed, is pivoted in the shank M' at L' and is also pivoted to the under side of the sliding rod K in seed box and a slot N' is cut in the bottom strip J so as to allow the said lever K' to play back and forth.

The dropping mechanism is operated by the usual knotted wire stretched across the field. On the top edges of the sides of the seed boxes are secured the journals T in which the shaft X has its bearings. An arm U is placed on each side of the seed boxes one end being secured to the shaft X as shown, and the lower end thereof pivotally attached to one end of a rod W, said rod being pivoted at its opposite end to the sliding rod K. On the outer sides of the seed boxes are secured, the frames Y Y as shown which are designed to support two arms Z Z, which form stops for the fork 4 of the operating mechanism, and also the pulleys 1, 2 and 3 used for guiding the check-row wire. Both ends of the shaft X outside of the journals T are squared as shown in Figs. 7 and 8, and a space of about an inch in length is turned up round in the middle of the square portion in which are placed the operating forks 4. These forks may be made of wrought iron and the lower ends may be simply bent up around the said shaft X, leaving enough play for easy movement. On either side of this fork 4 is placed a circular plate 5 and 6 which is provided with a square hole (in its center) to fit the square ends of the shaft and in the periphery of each plate is cut a notch as shown. The fork 4 mentioned above may be made in two halves and riveted together and between these halves is pivoted a forked pawl 7 which engages with the notches in the plates 5 and 6.

The operation of the entire device is as follows: When the planter, with its parts, is in the position shown in the drawings, and is moving forward with the check-row wire passing through the forks, and one of the knots in the wire engages with one of the said forks, the fork is carried toward the rear of the planter and strikes the rear stop Z after which the knot leaves the fork. During this movement, the pawl 7 being in engagement with the notches in the plates 5 and 6, turns the said plates around until the fork strikes the before mentioned stop Z and thereby the arm U is drawn toward the front of machine and in turn draws the sliding rod K also and this closes the seed aperture in the bottom of seed box by pushing the upper slide L thereover and at the same time, pushing the lower plate M forward bringing the slot N in said plate M under the said seed aperture, thus letting the seed drop therefrom and forcing the sliding half bottom of seed box forward and enlarging seed aperture to prevent wedging of seed therein. Also by this action, the lever K' in shank M' is carried forward, bringing the upper portion thereof against the upper part of shank and the seed being dropped from seed box into an angling recess in upper extremity of shank as shown in Fig. 9 is held therein until the lever is carried back to its first position, which lets the seed drop into a second recess between the lower free end of said lever and the front wall of shank and by a second forward movement of the lever K', the seed is dropped into the ground. When the knot in the wire leaves the fork 4, or rather when the fork leaves the knot, a spring V fastened to the sliding rod K and to the seed box, draws the said sliding rod back to its first position, thus closing the seed aperture at the bottom and opening it at the top for the reception of more seed and simultaneously throwing the fork 4 back to its first position by reason of the notches in the plates 5 and 6 and the pawl 7. It may be seen, that by reason of the pawl and notches in the plates, each fork may work independent of the other; in other words, when one fork is in operation, the other will remain in its reclining position until engagement with a knot in the wire.

Having thus described our invention, what we claim as new, and desire to secure by Letters Patent, is—

1. In a corn planter, the seed box A, having one half of the bottom thereof stationary and the other half movable and held in its normal position by a spring Q and having a semi-circular notch cut in the inner edges of each of said halves to form a seed aperture, the said fixed or stationary portion having a slot cut therein across its entire width and a plate J placed thereunder as set forth in combination with a plate composed of the ends D and E and bottom F with the slot F' as herein fully set forth and for the purposes described.

2. In a corn planter, the seed box A having one half of the bottom thereof stationary and the other half movable and held in its normal position by a spring Q, and having a semi-circular notch cut in the inner edges of each of said halves, to form a seed aperture, the said fixed or stationary portion having a slot cut therein across its entire width and a plate J placed thereunder in the manner and for the purposes specified.

3. In a corn planter, the seed box substantially as herein set forth in combination with a sliding rod K, to the upper side of which is hinged a cut off plate L, and to the under side of which is rigidly secured a lower cut off plate M, said plate M having a slot N cut therein for the purposes set forth and described.

4. In a corn planter, the combination with the seed box, of a rock shaft suitably journaled thereon and provided at either end with one or more notched circular plates rigidly secured thereto and operated by a suitably operated fork journaled on said shaft beside and between said circular plates, and of one or more depending rods secured to said rock shaft and operating a suitable seed dropping mechanism substantially in the manner and for the purposes set forth and described.

5. In a corn planter, the seed box substantially as set forth, in combination with a sliding rod K to the upper side of which is hinged an upper cut off plate L and to the under side of which is secured a lower cut off plate M and also pivoted to the lower side of said rod K, is the upper end of a lever K' said lever being also pivoted at or near the center of its length in the shank M' substantially as herein set forth and described.

In testimony whereof we affix our signatures in presence of two witnesses.

MELVILLE P. UPP.
JOHN C. YOUNG.

Witnesses:
WESLEY CRAGGS,
GEO. NORDIN.